(12) United States Patent  
Tominaga et al.

(10) Patent No.: US 12,469,056 B2  
(45) Date of Patent: Nov. 11, 2025

(54) EVALUATION APPARATUS, EVALUATION METHOD, AND COMPUTER READABLE STORAGE MEDIUM

(71) Applicant: HONDA MOTOR CO., LTD., Tokyo (JP)

(72) Inventors: Yuki Tominaga, Saitama (JP); Takuya Miyashita, Saitama (JP); Masayuki Kawamura, Saitama (JP)

(73) Assignee: HONDA MOTOR CO., LTD., Tokyo (JP)

(\*) Notice: Subject to any disclaimer, the term of this patent is extended or adjusted under 35 U.S.C. 154(b) by 1014 days.

(21) Appl. No.: 17/518,604

(22) Filed: Nov. 4, 2021

(65) Prior Publication Data

US 2022/0058699 A1 Feb. 24, 2022

Related U.S. Application Data

(63) Continuation of application No. PCT/JP2020/016314, filed on Apr. 13, 2020.

(30) Foreign Application Priority Data

May 9, 2019 (JP) .................... 2019-089376

(51) Int. Cl.
| | | |
|---|---|---|
| *G06Q 30/02* | (2023.01) | |
| *B60L 50/60* | (2019.01) | |
| *H01M 10/48* | (2006.01) | |

(52) U.S. Cl.  
CPC .......... *G06Q 30/0278* (2013.01); *B60L 50/60* (2019.02); *H01M 10/48* (2013.01); *H01M 2220/20* (2013.01)

(58) Field of Classification Search  
CPC .... B60L 50/60; G06Q 30/0278; H01M 10/48; H01M 2220/20  
See application file for complete search history.

(56) References Cited

U.S. PATENT DOCUMENTS 11,437,836 B2\* 9/2022 Maruno ................ H02J 7/0068  
2002/0132144 A1 9/2002 McArthur  
(Continued)

FOREIGN PATENT DOCUMENTS

| CN | 1635962 A | 7/2005 |
|---|---|---|
| CN | 105706290 A | 6/2016 |

(Continued)

OTHER PUBLICATIONS

Office Action issued for counterpart Chinese Application 202080032120.3, issued by The State Intellectual Property Office of People's Republic of China on Dec. 8, 2023.

(Continued)

*Primary Examiner* — Oluseye Iwarere

(57) ABSTRACT

An evaluation apparatus acquires present output information and degree of decrease information for each secondary battery as well as minimum output information for secondary use place and expiration period information for each application, and, in a case where an expiration period is defined for an application of a secondary use place, calculates a maximum output for each secondary battery at a time when the expiration period ends, and uses the calculated maximum output to evaluate a relative degree of adaptation of a plurality of secondary batteries to the application.

21 Claims, 5 Drawing Sheets

(56) References Cited

U.S. PATENT DOCUMENTS

| | | | | |
|---|---|---|---|---|
| 2011/0050239 A1* | 3/2011 | Hoshino | ................ | G06Q 30/06 |
| | | | | 324/435 |
| 2016/0162849 A1* | 6/2016 | Matsuyama | ............ | B60L 53/80 |
| | | | | 705/305 |
| 2017/0131364 A1* | 5/2017 | Hosaka | .................. | G01R 31/36 |
| 2018/0222343 A1 | 8/2018 | Uchida | | |
| 2018/0301770 A1* | 10/2018 | Nakaya | ................ | G01R 31/392 |
| 2020/0290477 A1* | 9/2020 | Kurimoto | ............ | G06Q 20/085 |
| 2020/0326382 A1* | 10/2020 | Matsumura | .......... | G01R 31/371 |
| 2020/0384889 A1* | 12/2020 | Nishigaki | ............... | B60L 50/66 |

FOREIGN PATENT DOCUMENTS

| | | | |
|---|---|---|---|
| JP | 2001057711 | A | 2/2001 |
| JP | 2014041768 | A | 3/2014 |
| JP | 2014041786 | A | 3/2014 |
| JP | 2014123393 | A | 7/2014 |
| JP | 2015115286 | A | 6/2015 |
| JP | 2016139572 | A | 8/2016 |
| JP | 2018050457 | A | 3/2018 |
| JP | 2018128769 | A | 8/2018 |

OTHER PUBLICATIONS (ISA/237) Written Opinion of the International Search Authority for International Patent Application No. PCT/JP2020/016314, mailed by the Japan Patent Office on Jun. 2, 2020.

\* cited by examiner

EVALUATION APPARATUS, EVALUATION METHOD, AND COMPUTER READABLE STORAGE MEDIUM

CROSS REFERENCE TO RELATED APPLICATION

The contents of the following Japanese patent application(s) are incorporated herein by reference:
NO. 2019-089376 filed in JP on May 9, 2019
NO. PCT/JP2020/016314 filed in WO on Apr. 13, 2020

BACKGROUND

1. Technical Field

The present invention relates to an evaluation apparatus, an evaluation method, and a computer readable storage medium.

2. Related Art

There is a known remaining life estimation apparatus that, in the case where a battery used in a vehicle is reused in another application, uses the temperature increase rate in each application to estimate the remaining life of a battery in the other application (see, for example, Patent document 1). Furthermore, there is a known facility management system that calculates the remaining value of a storage battery based on the historical operation information of the storage battery, acquires the information of a system of the reuse place of the storage battery, and chooses the storage battery having a remaining value satisfying the content of demand information that the storage battery should meet required for the reuse place system (see, for example, Patent document 2).

PRIOR ART DOCUMENT

Patent Document

[Patent Document 1] Japanese Unexamined Patent Application, Publication No. 2015-115286
[Patent document 2] Japanese Unexamined Patent Application, Publication No. 2018-050457

DESCRIPTION OF EXEMPLARY EMBODIMENTS

Figure 1:
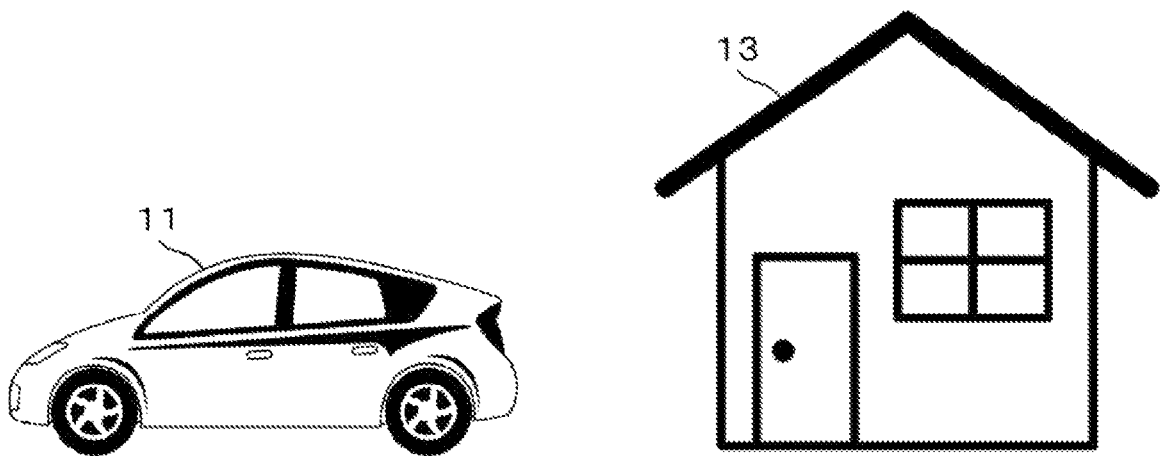
FIG. 1 is a diagram for illustrating that an evaluation apparatus 100 according to the present embodiment evaluates a relative degree of adaptation of a plurality of secondary batteries 10 depending on an application in a secondary use place.
Figure 1:
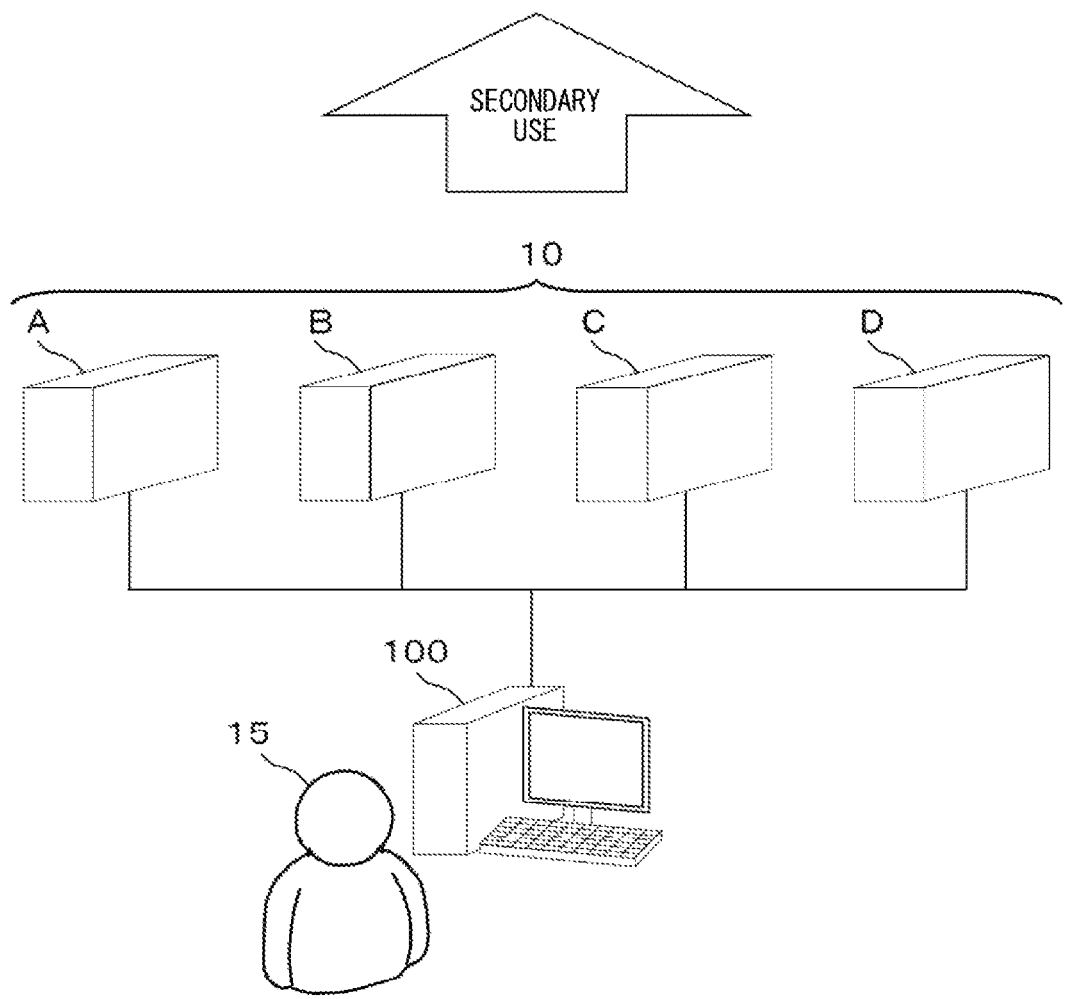

Hereafter, the present invention is explained through the embodiments of the invention, however, the embodiments listed below do not limit the invention according to the claims. In addition, not all combinations of features described in the embodiments are essential to the solution of the invention. It is noted that, in the drawings, the same referential numerals are assigned to the same or similar portions so as to omit overlapping explanation in some cases.

FIG. 1 is a diagram for illustrating that an evaluation apparatus 100 according to the present embodiment evaluates a relative degree of adaptation of a plurality of secondary batteries 10 depending on an application in a secondary use place. As one example, the secondary battery 10 according to the present embodiment is subject to a primary use in an electrically driven vehicle 11 such as EV and PHEV and then subject to a secondary use in another vehicle 11 or a secondary use as a stationary storage battery in a house 13. It is noted that the vehicle 11 and the house 13 are examples of a secondary use place. It is noted that, in the following description, the electrically driven vehicle 11 may be simply referred to as the vehicle 11.

The secondary battery 10 is, for example, an all solid state battery, a lithium ion battery, or the like. FIG. 1 shows four secondary batteries 10. Unique identifiers, for example A-D, are assigned to four secondary batteries 10, and managed by the evaluation apparatus 100. Present maximum outputs and deterioration rates in the future, namely, the degrees of decrease in the maximum output in the future may be different from each other among the secondary batteries 10 A-D.

The minimum outputs required for each of them to normally function, namely minimum outputs are set for the vehicle 11 and the house 13. Each of the vehicle 11 and the house 13 may, when the maximum output of the secondary battery 10 electrically connected thereto reaches the minimum output, warn that the secondary battery 10 should be exchanged with another secondary battery 10.

For a plurality of secondary batteries 10, for example the secondary batteries 10 A-D, the evaluation apparatus 100 according to the present embodiment uses the information acquired from each secondary battery 10 and the information related to the secondary use place input from, for example, the user 15 to evaluate the value in the secondary use place. More specifically, the evaluation apparatus 100 uses these pieces of information to evaluate, according to evaluation criteria different among applications in the secondary use place, relative degrees of adaptation of secondary batteries 10 A-D to each application. The application in the secondary use place as used herein is, as one example, a lease for which the expiration period of the secondary battery 10 is defined, a purchase for which the expiration period of the secondary battery 10 is not defined, or the like. It is noted that the expiration period for a lease may be a contract period for which a leasing company rents the secondary battery 10.

The evaluation apparatus 100 according to the present embodiment is connected to the secondary battery 10 in a wired manner to acquire information from each secondary battery 10. The evaluation apparatus 100 may be connected to the secondary battery 10 in a wireless manner for the similar purpose.

The evaluation apparatus 100 according to the present embodiment has a user interface such as a keyboard, a mouse, or the like for inputting information from the user 15. As one example, the evaluation apparatus 100 may be a PC installed in a store that collects and manages the plurality of secondary batteries 10 after the primary use. It is noted that the store in this case may be the leasing company as described above or a sales company that sells the plurality of secondary batteries 10, and the user 15 may be an employee who works for the store and uses the evaluation apparatus 100.

Figure 2:
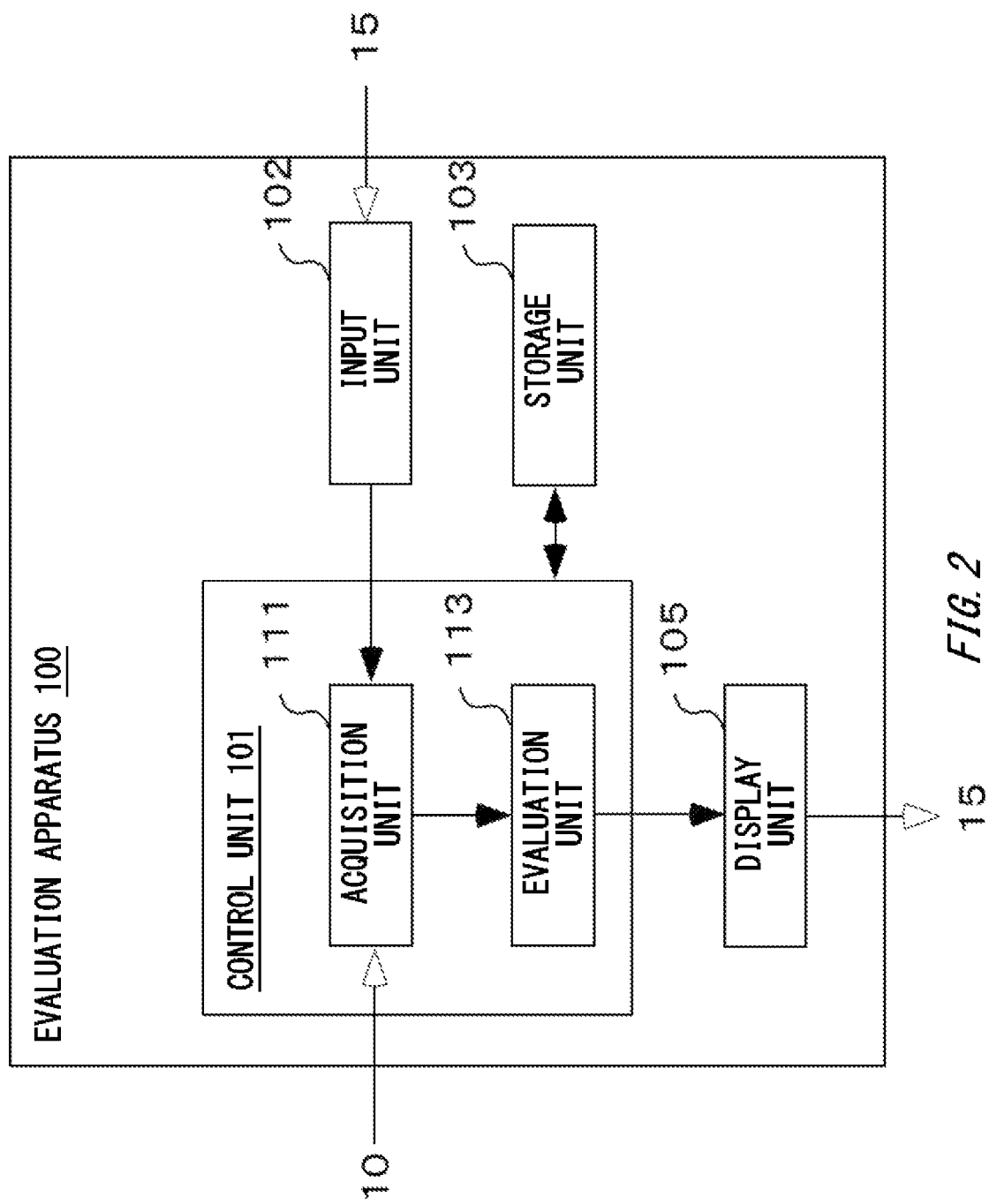
FIG. 2 is a block diagram of one example of the evaluation apparatus 100 according to the present embodiment for acquiring information from the secondary battery 10 and input information from the user 15.

FIG. 2 is a block diagram of one example of the evaluation apparatus 100 according to the present embodiment for acquiring information from the secondary battery 10 and input information from the user 15. The evaluation apparatus 100 according to the present embodiment includes a control unit 101, an input unit 102, a storage unit 103, and a display unit 105. The input unit 102 is the user interface as described above and outputs to the control unit 101 the information that has been input by the user 15. The control unit 101 has an acquisition unit 111 and an evaluation unit 113. It is noted that the evaluation unit 113 is one example of a first evaluation unit and a second evaluation unit.

The acquisition unit 111 acquires identifiers of the plurality of secondary batteries 10 together with present output information, degree of decrease information, minimum output information, and expiration period information. The present output information is the information indicating the present maximum output of each secondary battery 10 among the plurality of secondary batteries 10 managed by the evaluation apparatus 100. The degree of decrease information is the information indicating the predicted degree of decrease in the maximum output of each secondary battery 10 in the future in the secondary use place as described above. It is noted that, in the following description, the degree of decrease in the maximum output of the secondary battery 10 in the future may be simply referred to as degree of decrease.

The minimum output information is the information indicating the minimum output required in the secondary use place as described above. The expiration period information is the information indicating the expiration period of the plurality of secondary batteries 10 for each application among the plurality of applications in the secondary use place as described above. The expiration period information includes the information indicating whether the expiration period in the application in the secondary use place exist, and, if the expiration period exists, the information indicating the expiration period, for example three years. It is noted that, in the following description, the minimum output required in the secondary use place may be simply referred to as the minimum output of the secondary use place.

The acquisition unit 111 in the present embodiment further acquires vehicle information indicating whether the secondary use place is the vehicle 11, and deterioration information indicating the present deterioration state of each secondary battery 10. The deterioration information includes the information indicating which members have deteriorated among the plurality of members, for example, a negative terminal, a positive terminal, or the like, constituting the secondary battery 10. The acquisition unit 111 according to the present embodiment predicts the degree of decrease based on the acquired vehicle information and deterioration information to acquire the degree of decrease information of each secondary battery 10 as described above. The acquisition unit 111 outputs to the evaluation unit 113 the acquired present output information, degree of decrease information, minimum output information, expiration period information, and vehicle information. It is noted that, instead of the vehicle information, the information indicating whether the secondary use place is the house 13 or the like utilizing the secondary battery 10 as a stationary storage battery may be used.

It is noted that whether the secondary use place of the secondary battery 10 is the vehicle 11 or other than the vehicle 11, for example, the house 13 correlate with which members have deteriorated, as the result of the repeated charges/discharges of the secondary battery 10 in the primary use place, among the plurality of members constituting the secondary battery 10. Therefore, the acquisition unit 111 recognizes, from the deterioration information, which constituting members in the secondary battery 10 have deteriorated, and recognizes, from the vehicle information, whether the secondary use place is the vehicle 11, thereby determining whether a constituting part that has deteriorated in the secondary battery 10 will further deteriorate in the secondary use place and predicting the degree of decrease of the secondary battery 10.

It is noted that, in order to improve the accuracy of the prediction of the degree of decrease, the acquisition unit 111 may acquire use place information indicating at least any of whether the secondary use place is a particular climate zone affecting the capacity of each secondary battery 10 and whether a charges/discharges will be performed at a frequency that is equal to or higher than a particular frequency affecting the capacity of each secondary battery 10, and predict the degree of decrease based on the vehicle information, deterioration information, and use place information to acquire degree of decrease information for each secondary battery 10. For the similar purpose, the acquisition unit 111 additionally or alternatively may acquire the use information indicating the use aspect of electrical power in the secondary use place of the secondary battery 10, and use the use information, together with the vehicle information, the deterioration information, and the like, to predict the degree of decrease of the secondary battery 10.

If the expiration period information defines the expiration period for the application in the secondary use place, the evaluation unit 113 calculates, based on the present output information and the degree of decrease information, the maximum output at a time when the expiration period ends, for each secondary battery 10. The evaluation unit 113 uses the calculated maximum output to further evaluate the relative degree of adaptation of the plurality of secondary batteries 10 to the application in the secondary use place.

If the expiration period information does not define the expiration period for the application in the secondary use place, the evaluation unit 113 calculates, based on the present output information and the degree of decrease information, the time it takes for the maximum output to reach the minimum output indicated in the minimum output information, for each secondary battery 10. The evaluation unit 113 further uses the calculated time to evaluate the relative degree of adaptation of the plurality of secondary batteries 10 to the application in the secondary use place. The evaluation unit 113 outputs the evaluation result to the display unit 105.

The storage unit 103 stores the sequence, the program, or the like for controlling each configuration of the evaluation apparatus 100. The storage unit 103 is referred to by the control unit 101.

The display unit 105 displays to the user the information that is input from the evaluation unit 113 and indicates the evaluation result as described above. The display unit 105 of the present embodiment is, for example, a monitor of a PC. The display unit 105 may be, for example, a touch panel display, and in this case the display unit 105 may be integral to the input unit 102. It is noted that the evaluation apparatus 100 may additionally or alternatively output to the outside the information indicating the evaluation result.

Figure 3:
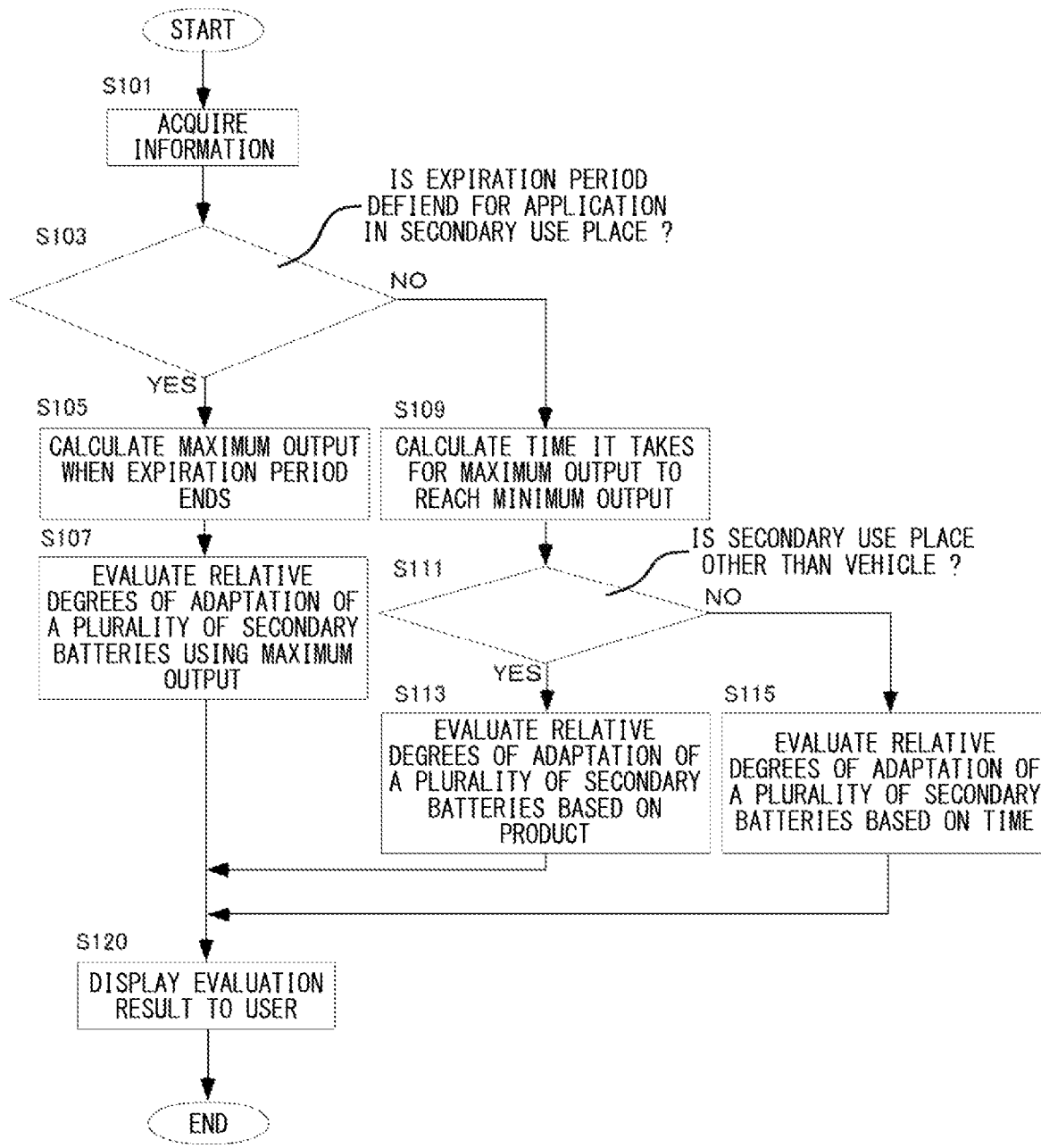
FIG. 3 is a flow diagram of one example of an evaluation method according to the present embodiment.
Figure 4:
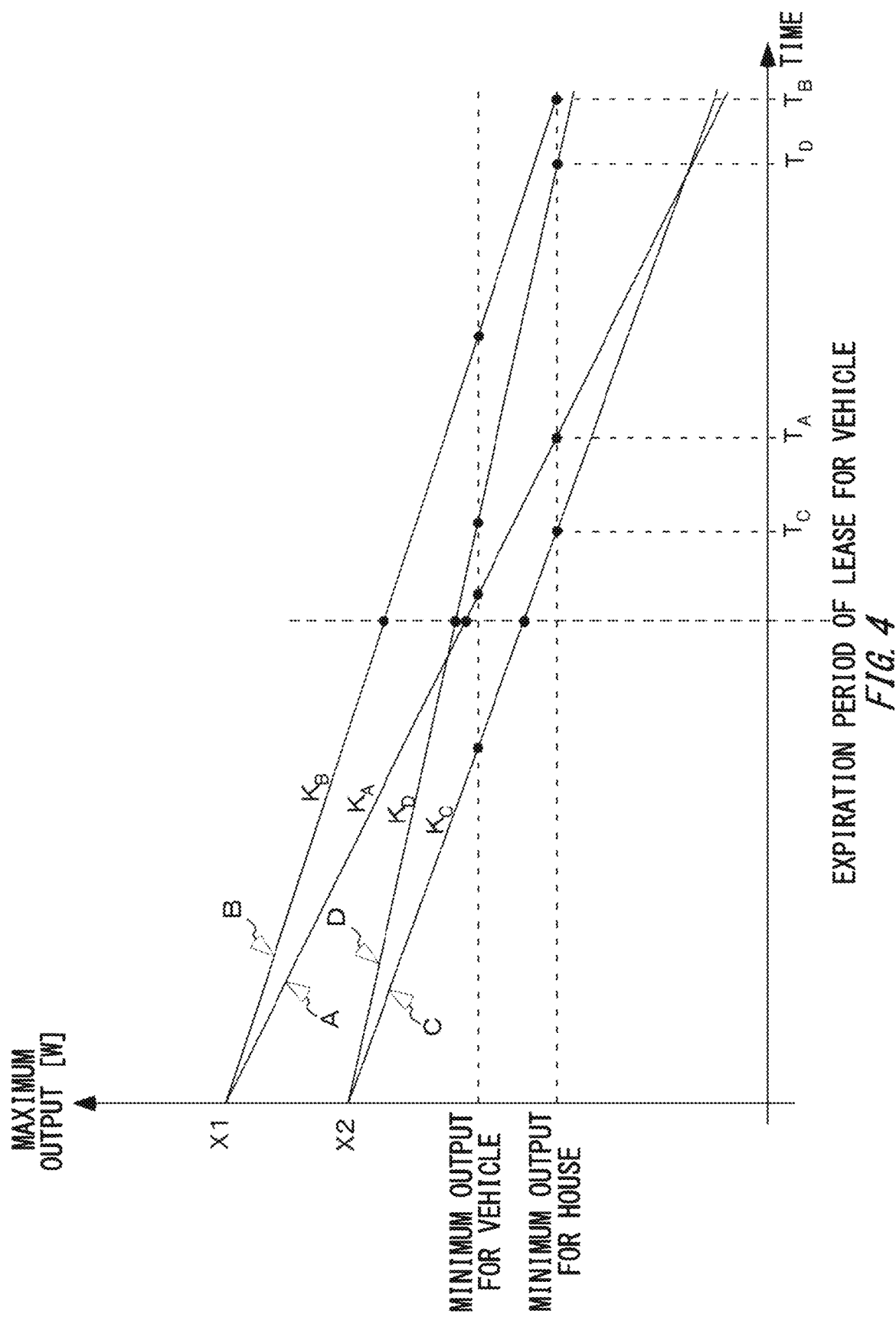
FIG. 4 is a graph for illustrating one example of a method according to the present embodiment for performing a relative evaluation for each application in the secondary use place based on the relationship between a maximum output and a degree of decrease.

FIG. 3 is a flow diagram of one example of an evaluation method according to the present embodiment. Furthermore, FIG. 4 is a graph for illustrating one example of a method according to the present embodiment for performing a relative evaluation for each application in the secondary use place based on the relationship between a maximum output and a degree of decrease. The horizontal axis of the graph in FIG. 4 indicates the time and the vertical axis indicates the maximum output [W] of the secondary battery 10. It is noted that in the graph in FIG. 4 time 0 is assumed as the present moment.

On the graph in FIG. 4, the minimum output of the vehicle 11 and the minimum output of the house 13, which is lower than the minimum output of the vehicle 11, are each indicated with straight dashed lines. Furthermore, on the graph in FIG. 4, the expiration period defined for one application in one secondary use place is similarly indicated with a straight dashed line.

In the present embodiment, as one example, it is assumed that at least any of the secondary batteries 10 A-D shown in FIG. 1 is leased for the vehicle 11 as the secondary use place and the expiration period defined for the lease is indicated with a straight dashed line on the graph in FIG. 4. Furthermore, it is assumed that at least any of the secondary batteries 10 A-D is purchased for the house 13 as the secondary use place. It is noted that, as described above, in a case where the application is purchase, the expiration period is not defined.

Hereinafter, the flow in FIG. 3 is described with reference to the graph in FIG. 4. As one example, the flow in FIG. 3 starts upon a user input into the input unit 102 of the evaluation apparatus 100.

The evaluation apparatus 100 acquires the identifiers of the secondary battery 10 A-D that it manages, together with present output information, degree of decrease information, minimum output information, and expiration period information (step S101). As one specific example, the acquisition unit 111 of the present embodiment acquires the vehicle information, minimum output information, and expiration period information for each secondary use place that are input by the user 15 via the input unit 102. The acquisition unit 111 also acquires the present output information and deterioration information from each of the secondary battery 10 A-D connected to the evaluation apparatus 100. The acquisition unit 111 also predicts the degree of decrease based on the vehicle information and deterioration information for each secondary battery 10 A-D to acquire the degree of decrease information for each secondary battery 10 A-D.

As one example, the three straight dashed lines indicated on the graph in FIG. 4 can be drawn based on the minimum output information and expiration period information for each secondary use place that are acquired by the evaluation apparatus 100. Furthermore, the straight solid lines A-D indicated on the graph in FIG. 4 can be drawn based on the present output information and degree of decrease information for each secondary batteries 10 A-D that are acquired by the evaluation apparatus 100. In FIG. 4, the present maximum outputs of the secondary batteries 10 A-B are equal at X1 indicated on the vertical axis and similarly the present maximum outputs of the secondary batteries 10 C-D are equal at X2 indicated on the vertical axis. Furthermore, in FIG. 4, each of the gradients of straight solid lines A-D is indicated with $K_A$, $K_B$, $K_C$, and $K_D$. In the present embodiment, the secondary batteries 10 A-D have deterioration rates in the future, namely the degrees of decrease in the maximum outputs in the future, which are different from each other, and therefore the gradients $K_A$-$K_D$ of the straight solid lines A-D indicated in FIG. 4 are different from each other.

The evaluation apparatus 100 determines whether the expiration period information for each secondary use place defines an expiration period for an application in the secondary use place (step S103), and, in a case where the expiration period is defined (step S103: YES), calculates, based on the present output information and the degree of decrease information, the maximum output at a time when the expiration period ends (step S105), for each secondary battery 10 A-D, and uses the maximum output of each secondary battery 10 A-D to evaluate the relative degree of adaptation of the secondary battery 10 A-D (step S107).

As one specific example, the evaluation unit 113 in the present embodiment evaluates, for the secondary batteries 10 A-D, that, as the maximum output at a time when the calculate expiration period ends is equal to or higher than the minimum output required in the secondary use place indicated in the minimum output information and is closer to the minimum output, the relative degree of adaptation to the application in the secondary use place is higher.

As one example, the relative degree of adaptation to a lease of the vehicle 11 is evaluated to be higher when the secondary battery 10 corresponds to, in FIG. 4, the intersection that is above the straight dashed line indicating the minimum output of the vehicle 11 and is closer to the straight dashed line indicating the minimum output of the vehicle 11, among the intersections between the straight dashed line indicating the particular expiration period for the lease for the vehicle 11 and each of the straight solid lines of the secondary batteries 10 A-D. In other words, it is evaluated that among the secondary batteries 10 A-D, the secondary battery 10 A has the highest relative degree of adaptation, and relative degree of adaptations decrease in the order of the secondary battery 10 A, the secondary battery 10 D, the secondary battery 10 B, and the secondary battery 10 C.

The evaluation unit 113 in the present embodiment evaluates that, among the secondary batteries 10 A-D, the secondary battery 10 has the highest relative degree of adaptation to the application of lease for the vehicle 11 for a particular expiration period, making it possible to choose the secondary battery 10 which is the most efficient in the application in the secondary use place, in other words, preventing the secondary battery 10 with an excessive output from being used for the application.

The evaluation apparatus 100 displays to the user 15 the information indicating the evaluation result as described above (step S120) and the flow ends. As one specific example, the evaluation unit 113 in the present embodiment outputs to the display unit 105 the information indicating the evaluation result as described above and the display unit 105 displays the information to the user.

One example of the information displayed on the display unit 105 may include a secondary use place, an application, whether there is an expiration period, an expiration period, and each piece of information of the identifiers of the secondary batteries 10 A-D to be evaluated, and the ordered information in which the relative degree of adaptation to the application of the secondary batteries 10 A-D are ordered. Instead of the ordered information, the information in which the relative degrees of adaptation to the applications of the secondary batteries 10 A-D are represented with inequality signs, the information in which the degrees of adaptation are represented by being ordered in the descending order or the like may be included. It is noted that, among the secondary batteries 10 A-D, two or more secondary batteries 10 whose relative degrees of adaptation to the applications are the same may be included.

It is noted that the evaluation unit 113 in the present embodiment may determine that, among the secondary batteries 10 A-D, the secondary battery 10 C whose maximum output is predicted to be lower than the minimum output of the vehicle 11 before a particular expiration period for the lease for the vehicle 11 ends is unable to be used for the application in the vehicle 11, and output the information indicating the determination result to the display unit 105 for displaying it to the user 15. Furthermore, if it is predicted that any of the maximum outputs of the secondary batteries 10 A-D will also be lower than the minimum output of the vehicle 11 before a particular expiration period for the lease for the vehicle 11 ends, the evaluation unit 113 may cause the display unit 105 to display the information prompting the user 15 to re-input the information indicating a new expiration period.

If no expiration period is defined in step S103 (step S103: NO), the evaluation apparatus 100 calculates, for each secondary battery 10 A-D, based on the present output information and the degree of decrease information, the time it takes for each maximum output to reach the minimum output indicated in the minimum output information of the secondary use place (step S109) and further determines whether the secondary use place is other than the vehicle 11 (step S111).

If the secondary use place is other than the vehicle 11 (step S111: YES), the evaluation apparatus 100 evaluates, for the secondary batteries 10 A-D, based on the value obtained by multiplying the calculated time and the sum of the present maximum output and the minimum output required in the secondary use place, the relative degree of adaptation of the secondary batteries 10 A-D to the application in the secondary use place, followed by step S120 as described above.

On the other hand, if the secondary use place is the vehicle 11 (step S111: NO), the evaluation apparatus 100 evaluates, for the secondary batteries 10 A-D, based on the calculate time, the relative degrees of adaptation of the secondary batteries 10 A-D to the application in the secondary use place, followed by step S120 as described above.

As one specific example, if no expiration period is defined for the application in the expiration period information of the secondary use place, the evaluation unit 113 in the present embodiment calculates, for each secondary battery 10 A-D, based on the present output information and the degree of decrease information, the time it takes for the maximum output to reach the minimum output indicated in the minimum output information, and evaluates, based on the vehicle information of the secondary use place, the relative degrees of adaptation of the secondary batteries 10 A-D to the application in the secondary use place, using the calculated time.

More specifically, if the secondary use place is other than the vehicle 11, the evaluation unit 113 in the present embodiment evaluates, for the secondary batteries 10 A-D, that the relative degrees of adaptation to the application in the secondary use place is higher as the product obtained by multiplying the calculated time by the sum of the present maximum output indicated in the present output information and the minimum output required in the secondary use place indicated in the minimum output information is higher. As one example, as shown in FIG. 1, if the application of the secondary battery 10 in the house 13 as the secondary use place is purchase, no expiration period is defined in the corresponding expiration period information. In this case, in FIG. 4, the time axis components $T_A$, $T_B$, $T_C$, and $T_D$ of the intersections between the straight dashed line indicating the minimum output of the vehicle 11 and each of the straight solid lines of the secondary batteries 10 A-D correspond to the time it takes for the maximum output of the secondary battery 10 to reach the minimum output of the vehicle 11.

For the secondary battery 10 A, the product as described above corresponds to the value that is twice the area of trapezoid defined, in the graph of FIG. 4, by the horizontal axis, the vertical axis, the straight dashed line indicating the minimum output of the house 13, the straight solid line of the secondary battery 10 A, and the straight dashed line indicating the time $T=T_A$. Similarly, for the secondary battery 10 B, the product as described above corresponds to the value that is twice the area of trapezoid defined, in the graph of FIG. 4, by the horizontal axis, the vertical axis, the straight dashed line indicating the minimum output of the house 13, the straight solid line of the secondary battery 10 B, and the straight dashed line indicating the time $T=T_B$. Furthermore, for the secondary battery 10 C, the product as described above corresponds to the value that is twice the area of trapezoid defined, in the graph of FIG. 4, by the horizontal axis, the vertical axis, the straight dashed line indicating the minimum output of the house 13, the straight solid line of the secondary battery 10 C, and the straight dashed line indicating the time $T=T_C$. Furthermore, for the secondary battery 10 D, the product as described above corresponds to the value that is twice the area of trapezoid defined, in the graph of FIG. 4, by the horizontal axis, the vertical axis, the straight dashed line indicating the minimum output of the house 13, the straight solid line of the secondary battery 10 D, and the straight dashed line indicating the time $T=T_D$.

The relative degree of adaptation for the purchase in the house 13 is evaluated to be higher as the product is higher. In other words, it is evaluated that, among the secondary batteries 10 A-D, the relative degree of adaptation of the secondary battery 10 B is the highest, and the relative degree of adaptation decreases in the order of the secondary battery 10 B, the secondary battery 10 D, the secondary battery 10 A, and the secondary battery 10 C. It is noted that the evaluation unit 113 may use the value obtained by dividing the product by two, namely, the value of the area of trapezoid as described above, to evaluate the relative degrees of adaptation to the applications in the secondary use places of the plurality of secondary batteries 10.

Furthermore, if the secondary use place is the vehicle 11, the evaluation unit 113 in the present embodiment evaluates, for the plurality of secondary batteries 10, that the relative degree of adaptation to the application in the secondary use place is higher as the calculated time is longer. As one example, in FIG. 4, the time axis components of the intersections between the straight dashed line indicating the minimum output of the vehicle 11 and each of the straight solid lines of the secondary batteries 10 A-D correspond to the time it takes for the maximum output of the secondary battery 10 to reach the minimum output of the vehicle 11, and the relative degree of adaptation for the purchase for the vehicle 11 is evaluated to be higher as the time axis component of the intersection is higher. In other words, it is evaluated that, among the secondary batteries 10 A-D, the relative degree of adaptation of the secondary battery 10 B is the highest, and the relative degree of adaptation decreases in the order of the secondary battery 10 B, the secondary battery 10 D, the secondary battery 10 A, and the secondary battery 10 C.

The evaluation unit 113 in the present embodiment evaluates that, among the secondary batteries 10 A-D, if purchased for other than the vehicle 11, for example the house 13, the relative degree of adaptation of the secondary battery 10 B to the application for the purchase for the house 13 is the highest, which makes it possible to choose the secondary battery 10 with the largest total charge/discharge amount by the time when the end of life for the application in the secondary use place is reached, in other words, preventing the secondary battery 10 with a low total charge/discharge amount by the time when the end of the life is reached from being used for the application. On the other hand, the evaluation unit 113 evaluates that, among the secondary batteries 10 A-D, if purchased for the vehicle 11, the relative degree of adaptation of the secondary battery 10 B to the application for the purchase for the vehicle 11 is the highest, which makes it possible to choose the secondary battery 10 that can be used for the longest time for the application in the secondary use place, in other words, preventing the secondary battery 10 with a shorter life from being used in the application.

As described above, if there is a plurality of applications for the secondary use place of the secondary battery 10, the evaluation apparatus 100 in the present embodiment is able to relatively evaluate which application each of the plurality of secondary batteries 10 intended for secondary use is appropriate to, using the evaluation criteria that are different for each application.

It is noted that, in the foregoing embodiment, the graph shown in FIG. 4 is the graph for describing one example of the method for performing a relative evaluation for each application in the secondary use place based on the relationship between the maximum output and the degree of decrease, and the evaluation apparatus 100 may not generate the graph as long as be it is able to identify the information required for performing each evaluation as described above, such as the size of the area of trapezoid as described above with reference to the graph in FIG. 4, for example.

In the foregoing embodiment, the acquisition unit 111 of the evaluation apparatus 100 has been described as a configuration that acquires the vehicle information that is input by the user 15 via the input unit 102 and outputs it to the evaluation unit 113, and the evaluation unit 113 evaluates, based on the vehicle information, the relative degree of adaptation of the plurality of secondary batteries 10 to the application in the secondary use place. Alternatively, the acquisition unit 111 may compare the minimum output indicated in the minimum output information that is input by the user 15 via, for example, the input unit 102 with a predetermined threshold, and if the minimum output is equal to or lower than the threshold, determine that the secondary use place is other than the vehicle 11, or if the minimum output is higher than the threshold, determine that the secondary use place is the vehicle 11, whereby acquiring vehicle information.

In the foregoing embodiment, the acquisition unit 111 of the evaluation apparatus 100 has been described as a configuration that acquires the vehicle information that is input by the user 15 via the input unit 102 and outputs it to the evaluation unit 113, and the evaluation unit 113 evaluates, based on the vehicle information, the relative degree of adaptation of the plurality of secondary batteries 10 to the application in the secondary use place. Alternatively, the evaluation unit 113 may compare the minimum output indicated in the minimum output information that is input by the user 15 via, for example, the input unit 102 with a predetermined threshold, and if the minimum output is equal to or lower than the threshold, determine that the secondary use place is other than the vehicle 11, or if the minimum output is higher than the threshold, determine that the secondary use place is the vehicle 11 and evaluate, based on the determination result, the relative degrees of adaptation of the plurality of secondary batteries 10 to the application in the secondary use place. In this case, the acquisition unit 111 may not acquire the vehicle information, and thus the acquisition unit 111 may not predict the degree of decrease based on at least the vehicle information and the deterioration information to acquire the degree of decrease information for each secondary battery 10 and instead may acquire the degree of decrease information from the outside via the wired communication, the wireless communication, or the input unit 102.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Note that dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

A computer-readable medium may include any tangible device that can store instructions to be executed by a suitable device, and as a result, the computer-readable medium having instructions stored thereon comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of the computer-readable medium may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flowcharts or block diagrams. Examples of the processor include a computer processor, a processing unit, a microprocessor, a digital signal processor, a controller, a microcontroller, and the like.

Figure 5:
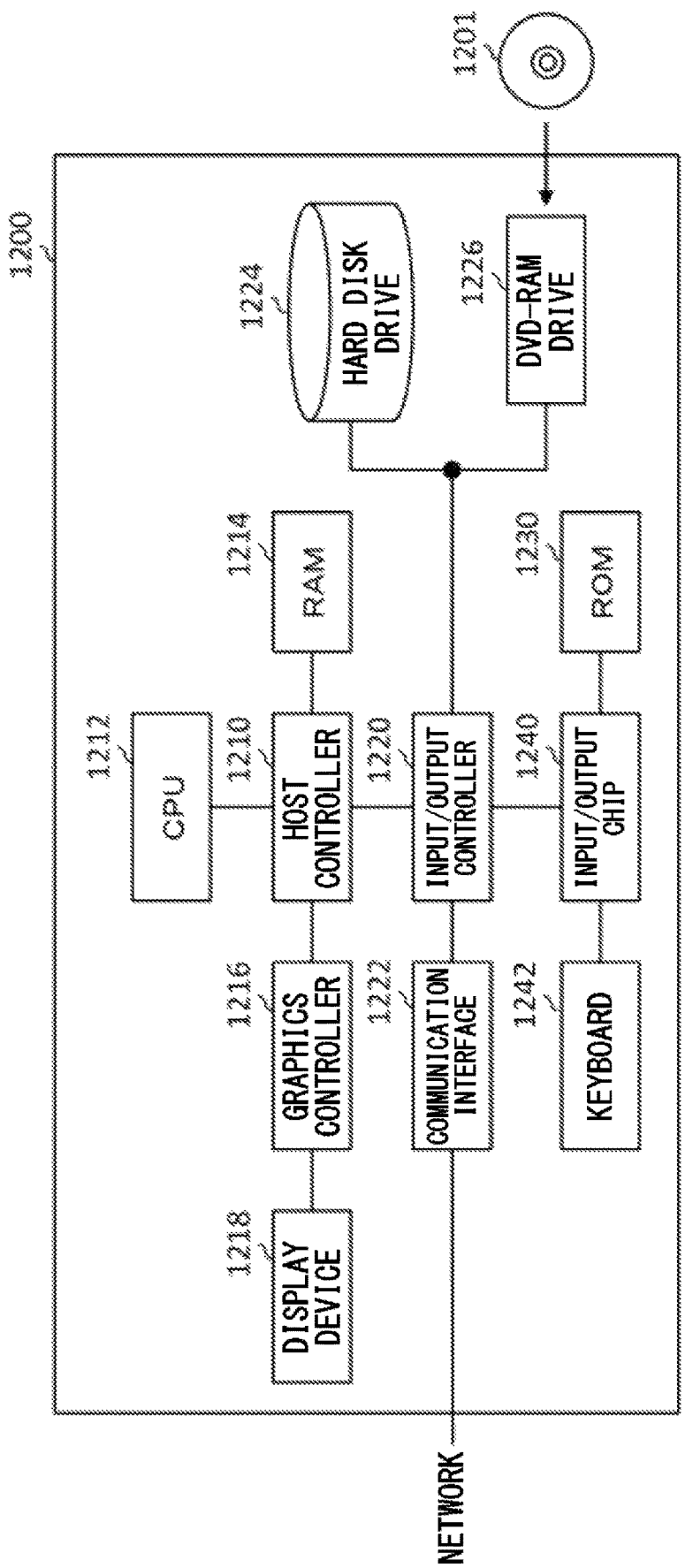
FIG. 5 is a diagram for illustrating one example of a computer 1200 in which a plurality of aspects of the present invention is entirely or partially embodied.

FIG. 5 shows an example of the computer 1200 which can realize a plurality of aspects of the present invention entirely or partially. A program installed on the computer 1200 can cause the computer 1200 to function as an operation associated with an apparatus according to embodiments of the present invention or as one or more "unit(s)" of the apparatus, or to perform the operation or the one or more "unit(s)", and/or can cause the computer 1200 to perform processes according to embodiments of the present invention or steps of the processes. Such a program may be executed by a CPU 1212 to cause the computer 1200 to perform particular operations associated with some or all blocks in the flowcharts or block diagrams described herein.

The computer 1200 according to the present embodiment includes a CPU 1212, a RAM 1214, a graphics controller 1216 and a display device 1218, which are connected to each other by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 via an input/output chip 1240.

The CPU 1212 operates in accordance with programs stored in the ROM 1230 and the RAM 1214, and controls each unit accordingly. The graphics controller 1216 acquires image data generated by the CPU 1212 on a frame buffer or the like provided in the RAM 1214 or in the graphics controller 1216 itself, and displays the image data on the display device 1218.

The communication interface 1222 communicates with other electronic devices via a network. The hard disk drive 1224 stores programs and data to be used by the CPU 1212 in the computer 1200. The DVD-ROM drive 1226 reads programs or data from the DVD-ROM 1201, and provides the programs or data to the hard disk drive 1224 via the RAM 1214. The IC card drive reads the program and data from the IC card, and/or writes the program and data to the IC card.

The ROM 1230 has stored therein a boot program or the like to be executed by the computer 1200 at the time of activation, and/or a program that depends on the hardware of the computer 1200. The input/output chip 1240 may also connect various input/output units to the input/output controller 1220 via a parallel port, a serial port, a keyboard port, a mouse port or the like.

Programs are provided by a computer-readable storage medium such as the DVD-ROM 1201 or an IC card. The programs are read from the computer-readable storage medium, installed on the hard disk drive 1224, the RAM 1214 or the ROM 1230, which are also examples of a computer-readable storage medium, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, if a communication is performed between the computer 1200 and external devices, the CPU 1212 may execute a communication program loaded on the RAM 1214, and instruct the communication interface 1222 to perform communication process based on the process described in the communication program. Under the control of the CPU 1212, the communication interface 1222 reads transmission data stored in a transmission buffer region provided in a recording medium such as the RAM 1214, the hard disk drive 1224, the DVD-ROM 1201 or an IC card, and sends the read transmission data to the network, or writes reception data received from the network into a reception buffer region or the like provided in the recording medium.

The CPU 1212 may also make all or required portions of the files or databases stored in an external recording medium such as the hard disk drive 1224, the DVD-ROM drive 1226 (DVD-ROM 1201) or an IC card to be read by the RAM 1214, and perform various types of processing on the data on the RAM 1214. The CPU 1212 may be configured to write back the processed data to the external recording medium.

Various types of information such as various types of programs, data, tables and databases may be stored in the recording medium for information processing. The CPU 1212 may also be configured to execute various types of processing on the data read from the RAM 1214, which includes various types of operations, processing of information, condition judging, conditional branching, unconditional branching, search/replacement of information and the like described in the present disclosure and designated by an instruction sequence of programs, and to write the result back to the RAM 1214. The CPU 1212 may also be configured to search for information in a file, a database, etc., in the recording medium. For example, when a plurality of entries, each having an attribute value of a first attribute associated with an attribute value of a second attribute, are stored in the recording medium, the CPU 1212 may search the plurality of entries for an entry whose attribute value of the first attribute matches a designated condition, read the attribute value of the second attribute stored in the entry, and thereby acquire the attribute value of the second attribute associated with the first attribute that meets a predetermined condition.

The programs or software modules in the above description may be stored on the computer 1200 or a computer-readable storage medium near the computer 1200. Furthermore, a recording medium such as a hard disk or a RAM provided in a server system connected to a dedicated communication network or the Internet can be used as a computer-readable storage media, which provides programs to the computer 1200 via the network.

While the embodiments of the present invention have been described, the technical scope of the invention is not limited to the above described embodiments. It is apparent to persons skilled in the art that various alterations and improvements can be added to the above-described embodiments. Furthermore, to the extent that there is no technical contradiction, the matters described for the specific embodiment can be applied to other embodiments. Furthermore, each component may have features similar to those of other components which have the same name and have the different numerals. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

- 10 secondary battery,
- 11 vehicle,
- 13 house,
- 15 user
- 100 evaluation apparatus,
- 101 control unit,
- 103 storage unit,
- 105 display unit,
- 111 acquisition unit,
- 113 evaluation unit,
- 1200 computer,
- 1201 DVD-ROM,
- 1210 host controller,
- 1212 CPU,
- 1214 RAM,
- 1216 graphics controller,
- 1218 display device,
- 1220 input/output controller,
- 1222 communication interface,
- 1224 hard disk drive,
- 1226 DVD-ROM drive,
- 1230 ROM,
- 1240 input/output chip,
- 1242 keyboard

What is claimed is:

1. An evaluation apparatus for evaluating a value of a plurality of secondary batteries in a secondary use place, comprising:
    at least one processor;
    an acquisition unit for, using the at least one processor, acquiring:
        (A) present output information indicating a present maximum output of each secondary battery in the plurality of secondary batteries;
        (B) degree of decrease information indicating a predicted degree of decrease in a maximum output in a future of the each secondary battery in the secondary use place;
        (C) minimum output information indicating a minimum output required in the secondary use place; and
        (D) expiration period information indicating an expiration period of the plurality of secondary batteries for each application among a plurality of applications in the secondary use place;
    a first evaluation unit for, using the at least one processor, in a case where the expiration period is defined, in the expiration period information, for a first application that is one application among the plurality of applications in the secondary use place, calculating, based on the present output information and the degree of decrease information, for the each secondary battery end output information indicating a maximum output at a time when the expiration period ends, and evaluating a relative degree of adaptation of the plurality of secondary batteries to the first application by using the end output information that is calculated; and
    a second evaluation unit for, using the at least one processor, in a case where the expiration period is not defined, in the expiration period information, for a second application that is another application different from the one application among the plurality of applications in the secondary use place, calculating, based on the present output information and the degree of decrease information, for the each secondary battery a time it takes for the maximum output to reach the minimum output required in the secondary use place in the future and indicated in the minimum output information, and evaluating a relative degree of adaptation of the plurality of secondary batteries to the second application by using the time that is calculated.

2. The evaluation apparatus according to claim 1, wherein the first evaluation unit is configured to, using the at least one processor, evaluate that the relative degree of adaptation of the plurality of secondary batteries to the first application is higher as the maximum output that is calculated is equal to or higher than the minimum output indicated in the minimum output information and is closer to the minimum output.

3. The evaluation apparatus according to claim 1, wherein the second evaluation unit is configured to, using the at least one processor, in a case where the secondary use place is other than an electrically driven vehicle, evaluate that the relative degree of adaptation of the plurality of secondary batteries to the second application is higher as an value obtained by multiplying the time that is calculated by a sum of the present maximum output indicated in the present output information and the minimum output indicated in the minimum output information is higher, and, in a case where the secondary use place is an electrically driven vehicle, evaluate that the relative degree of adaptation of the plurality of secondary batteries to the second application is higher as the time that is calculated is longer.

4. The evaluation apparatus according to claim 2, wherein the second evaluation unit is configured to, using the at least one processor, in a case where the secondary use place is other than an electrically driven vehicle, evaluate that the relative degree of adaptation of the plurality of secondary batteries to the second application is higher as an value obtained by multiplying the time that is calculated by a sum of the present maximum output indicated in the present output information and the minimum output indicated in the minimum output information is higher, and, in a case where the secondary use place is an electrically driven vehicle, evaluate that the relative degree of adaptation of the plurality of secondary batteries to the second application is higher as the time that is calculated is longer.

5. The evaluation apparatus according to claim 3, wherein the acquisition unit is configured to, using the at least one processor, (E) acquire vehicle information indicating whether the secondary use place is an electrically driven vehicle, and
    the second evaluation unit is configured to, using the at least one processor, evaluate the relative degree of adaptation of the plurality of secondary batteries to the second application, based on the vehicle information.

6. The evaluation apparatus according to claim 4, wherein the acquisition unit is configured to, using the at least one processor, (E) acquire vehicle information indicating whether the secondary use place is an electrically driven vehicle, and the second evaluation unit is configured to, using the at least one processor, evaluate the relative degree of adaptation of the plurality of secondary batteries to the second application, based on the vehicle information.

7. The evaluation apparatus according to claim 5, wherein the acquisition unit is configured to, using the at least one processor:
(F) acquire deterioration information indicating a present deterioration state of the each secondary battery; and
predict a degree of decrease in the maximum output in the future based on the vehicle information and the deterioration information to acquire the degree of decrease information of the each secondary battery.

8. The evaluation apparatus according to claim 6, wherein the acquisition unit is configured to, using the at least one processor:
(F) acquire deterioration information indicating a present deterioration state of the each secondary battery; and
predict a degree of decrease in the maximum output in the future based on the vehicle information and the deterioration information to acquire the degree of decrease information of the each secondary battery.

9. The evaluation apparatus according to claim 7, wherein the acquisition unit is configured to, using the at least one processor:
(G) acquire use place information indicating at least any of whether the secondary use place is in a particular climate zone that affects a capacity of the each secondary battery, and whether a frequency at which charges/discharges are performed is equal to or more than a particular frequency that affects a capacity of the each secondary battery, and
predict a degree of decrease in the maximum output in the future based on the vehicle information, the deterioration information, and the use place information to acquire the degree of decrease information for the each secondary battery.

10. The evaluation apparatus according to claim 8, wherein the acquisition unit is configured to, using the at least one processor:
(G) acquire use place information indicating at least any of whether the secondary use place is in a particular climate zone that affects a capacity of the each secondary battery, and whether a frequency at which charges/discharges are performed is equal to or more than a particular frequency that affects a capacity of the each secondary battery, and
predict a degree of decrease in the maximum output in the future based on the vehicle information, the deterioration information, and the use place information to acquire the degree of decrease information for the each secondary battery.

11. The evaluation apparatus according to claim 5, wherein the acquisition unit is configured to, using the at least one processor, compare the minimum output indicated by the minimum output information with a predetermined threshold, and, in a case where the minimum output is equal to or lower than the threshold, determine that the secondary use place is other than an electrically driven vehicle, and, in a case where the minimum output is higher than the threshold, determine that the secondary use place is an electrical driven vehicle, whereby acquiring the vehicle information.

12. The evaluation apparatus according to claim 6, wherein the acquisition unit is configured to, using the at least one processor, compare the minimum output indicated by the minimum output information with a predetermined threshold, and, in a case where the minimum output is equal to or lower than the threshold, determine that the secondary use place is other than an electrically driven vehicle, and, in a case where the minimum output is higher than the threshold, determine that the secondary use place is an electrical driven vehicle, whereby acquiring the vehicle information.

13. The evaluation apparatus according to claim 7, wherein the acquisition unit is configured to, using the at least one processor, compare the minimum output indicated by the minimum output information with a predetermined threshold, and, in a case where the minimum output is equal to or lower than the threshold, determine that the secondary use place is other than an electrically driven vehicle, and, in a case where the minimum output is higher than the threshold, determine that the secondary use place is an electrical driven vehicle, whereby acquiring the vehicle information.

14. The evaluation apparatus according to claim 8, wherein the acquisition unit is configured to, using the at least one processor, compare the minimum output indicated by the minimum output information with a predetermined threshold, and, in a case where the minimum output is equal to or lower than the threshold, determine that the secondary use place is other than an electrically driven vehicle, and, in a case where the minimum output is higher than the threshold, determine that the secondary use place is an electrical driven vehicle, whereby acquiring the vehicle information.

15. The evaluation apparatus according to claim 9, wherein the acquisition unit is configured to, using the at least one processor, compare the minimum output indicated by the minimum output information with a predetermined threshold, and, in a case where the minimum output is equal to or lower than the threshold, determine that the secondary use place is other than an electrically driven vehicle, and, in a case where the minimum output is higher than the threshold, determine that the secondary use place is an electrical driven vehicle, whereby acquiring the vehicle information.

16. The evaluation apparatus according to claim 10, wherein the acquisition unit is configured to, using the at least one processor, compare the minimum output indicated by the minimum output information with a predetermined threshold, and, in a case where the minimum output is equal to or lower than the threshold, determine that the secondary use place is other than an electrically driven vehicle, and, in a case where the minimum output is higher than the threshold, determine that the secondary use place is an electrical driven vehicle, whereby acquiring the vehicle information.

17. The evaluation apparatus according to claim 3, wherein the second evaluation unit is configured to, using the at least one processor, compare the minimum output indicated by the minimum output information with a predetermined threshold, and, in a case where the minimum output is equal to or lower than the threshold, determine that the secondary use place is other than an electrically driven vehicle, and, in a case where the minimum output is higher than the threshold, determine that the secondary use place is an electrically driven vehicle.

18. The evaluation apparatus according to claim 1, wherein the first application for which the expiration period is defined is a lease of a secondary battery, and the second application for which the expiration period is not defined is a purchase of a secondary battery.

19. An evaluation method for evaluating a value of a plurality of secondary batteries in a secondary use place, comprising:
acquiring:

(A) present output information indicating a present maximum output of each secondary battery in the plurality of secondary batteries;
(B) degree of decrease information indicating a predicted degree of decrease in a maximum output in a future of the each secondary battery in the secondary use place;
(C) minimum output information indicating a minimum output required in the secondary use place; and
(D) expiration period information indicating an expiration period of the plurality of secondary batteries for each application among a plurality of applications in the secondary use place; and in a case where the expiration period is defined, in the expiration period information, for a first application that is one application among the plurality of applications in the secondary use place, calculating, based on the present output information and the degree of decrease information, for the each secondary battery end output information indicating a maximum output at a time when the expiration period ends, and evaluating a relative degree of adaptation of the plurality of secondary batteries to the first application by using the end output information that is calculated; and in a case where the expiration period is not defined, in the expiration period information, for a second application that is another application different from the one application among the plurality of applications in the secondary use place, calculating, based on the present output information and the degree of decrease information, for the each secondary battery a time it takes for the maximum output to reach the minimum output required in the secondary use place in the future and indicated in the minimum output information, and evaluating a relative degree of adaptation of the plurality of secondary batteries to the second application by using the time that is calculated.

20. A non-transitory computer readable storage medium storing a program for, when executed by a computer configured to evaluate a value of a plurality of secondary batteries in a secondary use place, causing the computer to perform:
an acquisition procedure for acquiring:
(A) present output information indicating a present maximum output of each secondary battery in the plurality of secondary batteries;
(B) degree of decrease information indicating a predicted degree of decrease in a maximum output in a future of the each secondary battery in the secondary use place;
(C) minimum output information indicating a minimum output required in the secondary use place; and
(D) expiration period information indicating an expiration period of the plurality of secondary batteries for each application among a plurality of applications in the secondary use place; and an evaluation procedure for, in a case where the expiration period is defined, in the expiration period information, for a first application that is one application among the plurality of applications in the secondary use place, calculating, based on the present output information and the degree of decrease information, for the each secondary battery end output information indicating a maximum output at a time when the expiration period ends, and evaluating a relative degree of adaptation of the plurality of secondary batteries to the first application by using the end output information that is calculated; and in a case where the expiration period is not defined, in the expiration period information, for a second application that is another application different from the one application among the plurality of applications in the secondary use place, calculating, based on the present output information and the degree of decrease information, for the each secondary battery a time it takes for the maximum output to reach the minimum output required in the secondary use place in the future and indicated in the minimum output information, and evaluating a relative degree of adaptation of the plurality of secondary batteries to the second application by using the time that is calculated.

21. The evaluation apparatus according to claim 1, wherein the expiration period is commonly applied to the plurality of secondary batteries.

* * * * *